(12) United States Patent
Kishikawa et al.

(10) Patent No.: US 9,417,117 B2
(45) Date of Patent: Aug. 16, 2016

(54) TWO STAGE OVERLOAD PROTECTION DEVICE FOR A WEIGHING HOPPER

(71) Applicant: ISHIDA CO., LTD., Kyoto-shi, Kyoto (JP)

(72) Inventors: Mikio Kishikawa, Ritto (JP); Shinji Takeichi, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 106 days.

(21) Appl. No.: 14/565,998

(22) Filed: Dec. 10, 2014

(65) Prior Publication Data

US 2016/0169732 A1    Jun. 16, 2016

(51) Int. Cl.
| | |
|---|---|
| G01G 19/387 | (2006.01) |
| G01G 23/02 | (2006.01) |
| G01G 3/14 | (2006.01) |
| G01G 23/00 | (2006.01) |

(52) U.S. Cl.
CPC ............ *G01G 23/005* (2013.01); *G01G 3/14* (2013.01); *G01G 19/387* (2013.01)

(58) Field of Classification Search
CPC . G01G 23/005; G01G 19/387; G01G 19/383; G01G 3/14
See application file for complete search history.

(56) References Cited

U.S. PATENT DOCUMENTS

| | | | | |
|---|---|---|---|---|
| 3,135,112 A * | 6/1964 | Farley | ................... | G01L 1/2243 |
| | | | | 73/862.382 |
| 5,232,061 A * | 8/1993 | Neeleman | .............. | G01G 23/06 |
| | | | | 177/184 |
| 5,319,161 A * | 6/1994 | Miller | ................... | G01G 23/005 |
| | | | | 177/154 |
| 5,591,944 A * | 1/1997 | Meyer | ................... | G01G 3/1412 |
| | | | | 177/154 |
| 6,057,516 A * | 5/2000 | Nakamura | ............... | G01G 7/02 |
| | | | | 177/154 |
| 6,703,568 B2 * | 3/2004 | Wako | .................... | G01G 19/393 |
| | | | | 177/180 |
| 7,432,457 B2 * | 10/2008 | Vayhinger | .............. | G01G 21/23 |
| | | | | 177/154 |
| 9,046,434 B2 * | 6/2015 | Nagai | .................. | G01G 23/005 |
| 9,164,004 B2 * | 10/2015 | Schmittner | .............. | G01G 3/12 |
| 9,255,832 B2 * | 2/2016 | Schmittner | .............. | G01G 3/12 |
| 2015/0226601 A1 * | 8/2015 | Perrea | ...................... | G01G 21/23 |
| | | | | 177/145 |

FOREIGN PATENT DOCUMENTS

| | | |
|---|---|---|
| JP | H05-028937 A | 2/1993 |
| JP | H05-028937 U | 4/1993 |
| JP | 2013-250196 A | 12/2013 |
| WO | WO 2014/044413 A1 * 3/2014 | ............. G01G 21/23 |

\* cited by examiner

*Primary Examiner* — Randy W Gibson
(74) *Attorney, Agent, or Firm* — Global IP Counselors, LLP (57) ABSTRACT

A weighing device is equipped with a first overload protection mechanism and a second overload protection mechanism. The first overload protection mechanism includes a first support portion disposed on a fixing member and a first section disposed on a connecting member. The second overload protection mechanism includes a second support portion disposed on the fixing member and a second section disposed on the connecting member. When a first load acts on a weigh hopper, the first support portion supports the first section from below. When a second load greater than the first load acts on the weigh hopper, the second support portion supports the second section from above at the same time that the first support portion supports the first section.

6 Claims, 11 Drawing Sheets

<Prior Art>

TWO STAGE OVERLOAD PROTECTION DEVICE FOR A WEIGHING HOPPER

FIELD OF THE INVENTION

The present invention relates to a weighing device using a load cell and particularly relates to a weighing device equipped with a mechanism for protecting a load cell from an overload.

BACKGROUND OF THE INVENTION

Conventionally, as means for protecting a load cell of a weighing device from an overload, a method to regulate the movement of the free end side of the load cell within a predetermined range is employed. For example, patent document 1 (Japanese Utility Model Application Publication No. H05-28937) discloses a stopper mechanism of the load cell, which has a boss (connecting member) attached to the free end side of a load cell, a projecting portion projecting in a horizontal direction from the boss, a load receiving portion fixed to the boss, and a regulating portion disposed in such a way a space is present between the regulating portion and the projecting portion in vertical direction, wherein when a load is applied to the load receiving portion, the projecting portion comes into contact with the regulating portion to thereby regulate excessive movement.

SUMMARY OF THE INVENTION

Technical Problem

However, the stopper mechanism described above deals with an overload that can occur in normal operation, and therefore, when an abnormal load acts on the load receiving portion in such cases where excessive force is applied when removing the load receiving portion or a worker improperly gets on the load receiving portion, the load cell is sometimes damaged due to a force in the opposite direction of the load direction generated at the free end of the load cell by using the regulating portion as a fulcrum.

It is an object of the present invention to provide a weighing device that can protect a load cell from an overload even when an abnormal load acts on a load receiving portion or a connecting member.

Solution to Problem

A weighing device pertaining to a first aspect of the present invention is a weighing device using a load cell. The weighing device comprises a fixing member, a weigh hopper, a connecting member, and an overload protection mechanism. The fixing member fixes one end of the load cell. The weigh hopper is loaded with a weighing object. The connecting member connects the weigh hopper and a free end of the load cell. The overload protection mechanism protects the load cell from an overload. The overload protection mechanism has a first support portion and a second support portion that are disposed on the fixing member. When a first load acts on the load cell, the first support portion supports from below a first section that is set on either the load cell or the connecting member, directly or via a prescribed member. When a second load greater than the first load acts on the load cell, at the same time that the first support portion supports the first section, the second support portion supports from above a second section that is set on either the connecting member or the load cell in the side opposite to the weigh hopper across the first support portion.

In this weighing device, when an abnormal load acts on the weigh hopper or the connecting member, downward displacement of the free end of the load cell beyond a limit is limited because the first support portion supports the first section of the connecting member from below. Furthermore, when the second load greater than the first load acts, a bending moment occurs in the connecting member with the first support portion as a fulcrum and the connecting member is deformed upward, but upward displacement of the free end of the load cell beyond a limit is limited because the second support portion supports from above the second section that is set on either the connecting member or the load cell.

A weighing device pertaining to a second aspect of the present invention is the weighing device pertaining to the first aspect, wherein the second support portion is disposed in a position further away from the first support portion than the free end of the load cell.

In this weighing device, in principle it suffices for the second support portion to be positioned above the free end of the load cell, but the degree of freedom in the disposition of the second support portion is limited as a result of the connecting member being connected to the free end of the load cell. However, when the second support portion is disposed in a position further away from the first support portion than the free end of the load cell, the second support portion can be disposed avoiding interference with the surrounding structure without increasing the size of the structure.

A weighing device pertaining to a third aspect of the present invention is the weighing device pertaining to the first aspect, wherein the second support portion is disposed in a position further away from the first support portion than the fixed end of the load cell.

In this weighing device, the space between the second section and the second support portion becomes smaller as it is located closer to the first support portion because of the lever principle, and it becomes more difficult to finely adjust that space. However, it becomes easier to adjust the space between the second section and the second support portion when the second support portion is disposed in a position further away from the first support portion than the fixed end of the load cell.

A weighing device pertaining to a fourth aspect of the present invention is the weighing device pertaining to the first aspect, wherein the overload protection mechanism further has an upper opposing support portion that is positioned above the connecting member and opposes the first support portion across the connecting member.

In this weighing device, when a worker improperly handles the weigh hopper or the connecting member by pushing it upward, upward displacement of the free end of the load cell beyond a limit is limited because the upper opposing support portion supports the connecting member from above.

Advantageous Effects of Invention

In the weighing device pertaining to the present invention, when an abnormal load acts on the weigh hopper or the connecting member, downward displacement of the free end of the load cell beyond a limit is limited because the first support portion supports the first section of the connecting member from below. Furthermore, when the second load greater than the first load acts, a bending moment occurs in the connecting member with the first support portion as a fulcrum and the connecting member is deformed upward, but upward displacement of the free end of the load cell beyond a limit is limited because the second support portion supports from above the second section that is set on either the connecting member or the load cell.

DESCRIPTION OF THE EMBODIMENTS

Embodiments of the present invention will be described below with reference to the drawings. It will be noted that the following embodiments are specific examples of the present invention and are not intended to limit the technical scope of the present invention.

Figure 1:
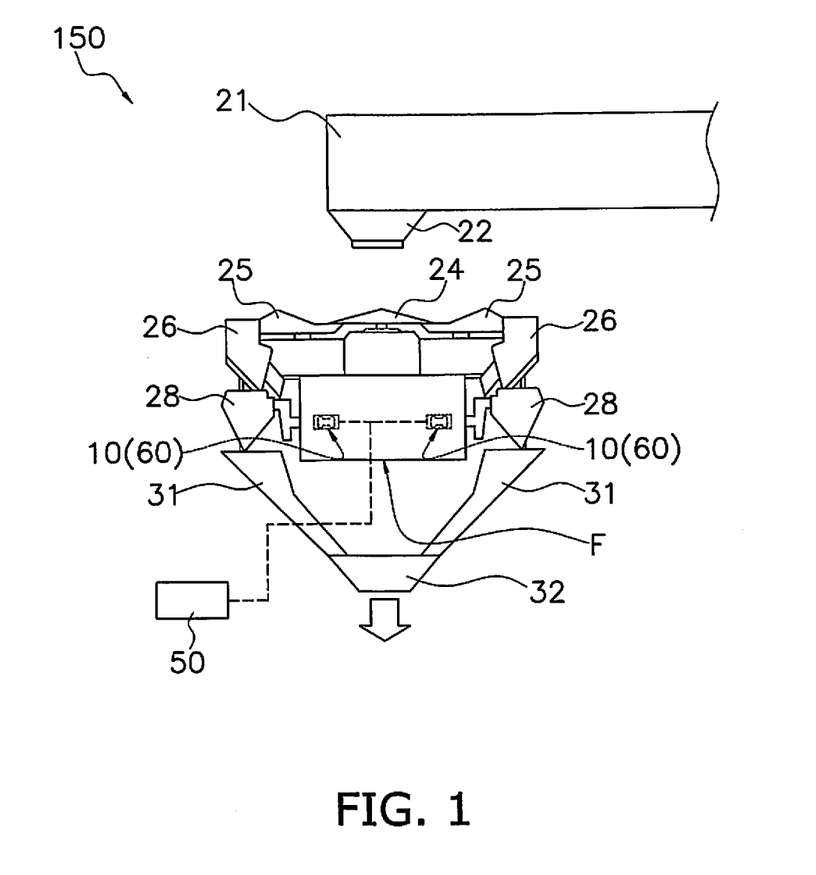
FIG. 1 is a front view of a combination weighing apparatus equipped with a weighing device pertaining to a first embodiment of the present invention.

First Embodiment (1) Configuration of Combination Weighing Machine 150 Equipped with Weighing Device FIG. 1 is a front view of a combination weighing machine 150 equipped with a weighing device pertaining to a first embodiment of the present invention. As shown in FIG. 1, the combination weighing machine 150 is equipped with a supply conveyor 21, a supply chute 22, a dispersion feeder 24, vibration feeders 25, pool hoppers 26, weigh hoppers 28, a collection chute 31, a control unit 50, weighing units 60, and a frame F.

The supply conveyor 21 conveys an article M to the supply chute 22. The article M that has passed through the supply chute 22 is dropped onto the vibrating dispersion feeder 24. Near the outer periphery of the dispersion feeder 24, the plural vibration feeders 25 are disposed radially as seen in a plane view. The vibration feeders 25 receive the article M dispersed around by the vibration of the dispersion feeder 24. Furthermore, the vibration feeders 25 can convey out the article M in a radial direction by vibrating at a predetermined amplitude and number of vibrations.

The pool hoppers 26 are disposed under the outer ends of the vibration feeders 25. Furthermore, the weigh hoppers 28 are disposed under the pool hoppers 26. The article M is conveyed to the pool hoppers 26 by the vibration of the vibration feeders 25 and is temporarily pooled there in concert with a weighing operation. Then, the article M is put into the weigh hoppers 28 when discharge gates of the pool hoppers 26 are opened.

The weighing units 60 measure the weight of the article M put into the weigh hoppers 28 with built-in load cells 10 and output weight signals to the control unit 50. The control unit 50 performs a combination calculation on the basis of the weight signals, selects weigh hoppers 28 in which combined weight is within an allowable range set on the basis of a target weight, opens the discharge gate of those weigh hoppers 28, collects the article M with the collection chute 31, and discharges the article M from a timing gate 32. The discharged article M is packaged by a packaging apparatus (not shown in the drawings) disposed below and a bagged product having a weight in the allowable range is provided.

The frame F supports the dispersion feeder 24, the vibration feeders 25, and the pool hoppers 26. Furthermore, the frame F supports the weighing units 60 inside. The weigh hoppers 28 are supported by the weighing units 60.

(2) Configuration of Weighing Device 100

In the present embodiment, a weighing device 100 includes the weigh hopper 28, the control unit 50, and the weighing unit 60.

Figure 2:
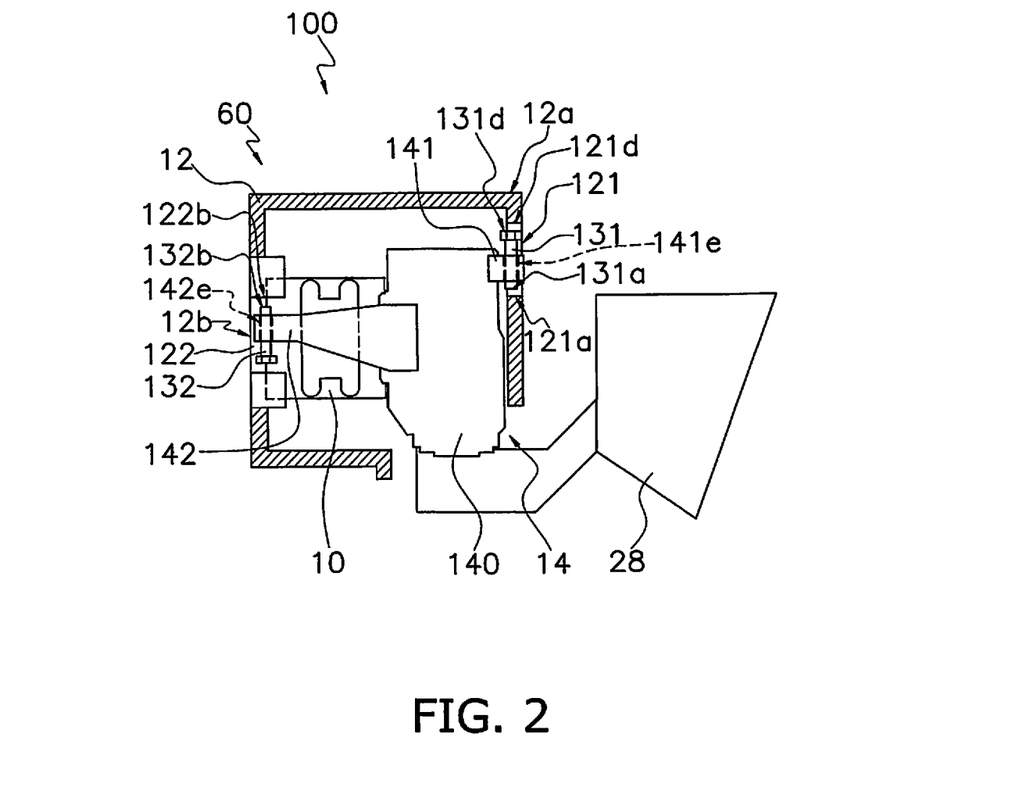
FIG. 2 is a perspective view of the weighing device pertaining to the first embodiment excluding a control unit.

FIG. 2 is a perspective view of the weighing device 100 pertaining to the first embodiment excluding the control unit 50. As shown in FIG. 2, the weighing unit 60 has a load cell 10, a fixing member 12, and a connecting member 14. The fixing member 12 fixes one end of the load cell 10 at a predetermined section. Hereinafter, among both ends of the load cell 10, the one end fixed to the fixing member 12 will be called as the fixed end and the other end not fixed to the fixing member 12 will be called as the free end. The connecting member 14 is a member that connects the weigh hopper 28 and the free end of the load cell 10.

(3) Detailed Configuration

(3-1) Fixing Member 12

The fixing member 12 is supported to the weighing device 100 via conventional structure (not shown) that supports the fixing member 12 in a fixed position such that the fixing member 12 supports the load cell 10, the connecting member 14 and the weigh hopper 28 during a weighing operation. The fixing member 12 is mainly divided into a first region 12a and a second region 12b. The first region 12a is disposed so as to cover the upper side of the connecting member 14. The second region 12b is disposed so as to cover the fixed end side of the load cell 10.

Furthermore, for supporting plural predetermined sections previously set on the connecting member 14, the fixing member 12 has plural support portions corresponding to respective predetermined sections. Specifically, the plural support portions include a first support portion 121a and a second support portion 122b.

The first support portion 121a is set at a lower end of an opening 121 formed in a position near the connecting member 14 in the first region 12a. The second support portion 122b is set at an upper end of a slit 122 formed in a position near the fixed end of the load cell 10 in the second region 12b.

It will be noted that, as shown in FIG. 2, the second support portion 122b is disposed in a position further away from the first support portion 121a than the free end of the load cell 10. This is because the degree of freedom in the disposition of the second support portion 122b is limited as a result of the connecting member 14 being fixedly connected to the free end of the load cell 10. In other words, the connecting member 14 is fixedly attached to the free end of the load cell 10. Disposition of the second support portion 122b in a position further away from the first support portion 121a than the free end of the load cell 10 inhibits interference with the surrounding structure and an increase in the size of the structure.

(3-2) Connecting Member 14

The connecting member 14 has a main body block 140, a first block 141, and a second block 142. The main body block 140 connects the free end of the load cell 10 and the weigh hopper 28.

The first block 141 projects from the main body block 140 in such a way as to penetrate the opening 121. The first block 141 has a screw hole 141e passing through it from the upper end side toward the lower end side of the opening 121. A first bolt 131 is screwed into the screw hole 141e. A space between the upper surface of the head portion of the first bolt 131 and the upper end of the opening and a space between the distal end of the first bolt 131 and the lower end of the opening are both set to predetermined dimensions.

The second block 142 extends from the main body block 140 in such a way that its distal end portion enters the slit 122. The distal end portion of the second block 142 has a screw hole 142e passing through it from the upper end side toward the lower end side of the slit 122. The second block 142 is positionally adjusted in such a way that the screw hole 142e faces the upper end of the slit 122, and a second bolt 132 is inserted into the screw hole 142e from the lower side of the screw hole 142e.

It will be noted that, for convenience of description, the distal end surface of the first bolt 131 facing the first support portion 121a will be called as a first section 131a and the upper surface of the distal end of the second bolt 132 facing the second support portion 122b will be called as a second section 132b.

(3-3) Overload Protection Mechanisms

In the weighing device 100, setups for protecting the load cell 10 from an overload include the first support portion 121a and the second support portion 122b. The setup in which the first support portion 121a supports the first section 131a functions as a first overload protection mechanism, and the setup in which the second support portion 122b supports the second section 132b functions as a second overload protection mechanism.

In the first overload protection mechanism, the first support portion 121a inhibits that the first section 131a is displaced equal to or more than a predetermined value. In the second overload protection mechanism, the second support portion 122b inhibits that the second section 132b is displaced equal to or more than a predetermined value. It will be noted that the setup of each overload protection mechanism is explained in the description of operation below.

(4) Operation

Figure 3:
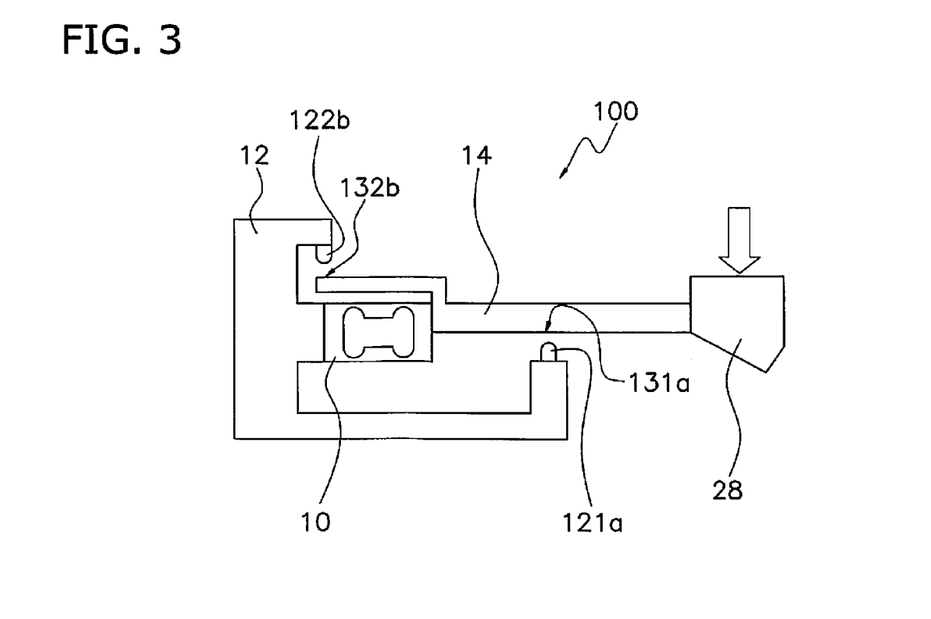
FIG. 3 is a schematic diagram of the weighing device in which it is simply modeled in accordance with the lever principle.
Figure 4:
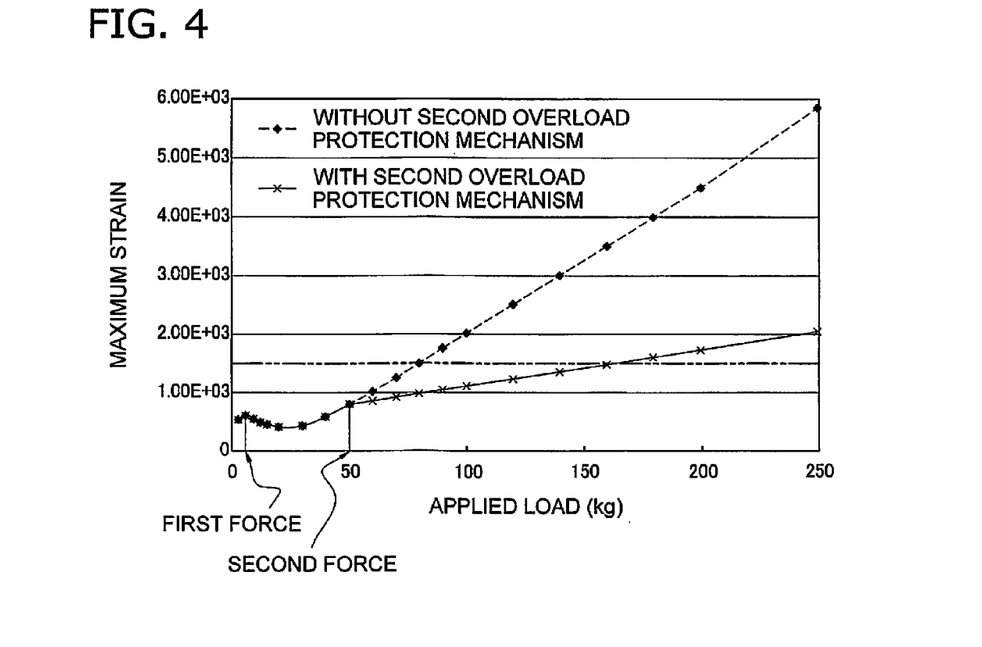
FIG. 4 is a graph showing the relationship between applied loads acting on a weigh hopper and maximum strain in the gauge surface of a load cell.

FIG. 3 is a configuration diagram of the weighing device 100 in which it is simply modeled in accordance with the lever principle. FIG. 4 is a graph showing the relationship between applied loads acting on the weigh hopper 28 and maximum strain in the gauge surface of the load cell 10.

(4-1) Setup of First Overload Protection Mechanism

First, as shown in FIG. 3, when a force in a downward direction acts on the weigh hopper 28, the connecting member 14 bends downward and the first section 131a approaches the first support portion 121a. Here, a first force is defined as a force acting on the weigh hopper 28 when the first section 131a comes into contact with the first support portion 121a. When a force greater than the first force acts on the weigh hopper 28, the first support portion 121a supports the first section 131a from below and inhibits the downward displacement of the first section 131a.

As shown in FIG. 4, the maximum strain in the gauge surface during this operation increases in a positive direction from when the force acts on the weigh hopper 28 until when the force reaches the first force. Then, when the force beyond the first force acts, the strain in the load cell 10 first decreases but thereafter starts to increase in the opposite direction (the positive direction). This is because the downward displacement of the free end of the load cell 10 is inhibited as a result of the first section 131a contacting the first support portion 121a, and, at the same time, a force to lift the free end of the load cell 10 upward acts as a result of a bending moment occurring in the connecting member 14 with the first support portion 121a as a fulcrum.

The principle by which the characteristic curve of the maximum strain turns from rise to fall from the point when the force acting on the weigh hopper 28 reaches the first force as shown in FIG. 4, and the principle by which the characteristic curve of the maximum strain has an inflection point at which the characteristic curve turns from fall to rise as the force acting on the weigh hopper 28 increases from the first force to a second force as shown in FIG. 4, will be described from the point of view of the strain gauge of the load cell 10.

First, in a state in which no force is being applied to the weigh hopper 28, the strain gauge is deformed by a certain amount because of tare weight, such as the weight of the weigh hopper 28 itself. Here, when the first force acts on the weigh hopper 28, the free end of the load cell 10 become displaced downward until the first section 131a comes into contact with the first support portion 121a, so the absolute value of the amount of deformation of the strain gauge becomes larger and the characteristic curve of the maximum strain in FIG. 4 rises.

However, once the first section 131a comes into contact with the first support portion 121a, a bending moment occurs in the connecting member 14 with the first support portion 121a as a fulcrum, so the free end of the load cell 10 displaced downward starts to become displaced upward. At this time, as the free end of the load cell 10 is being displaced upward, the absolute value of the amount of deformation of the strain gauge turns to decrease and the characteristic curve of the maximum strain thereby falls.

Then, at the point when the amount of deformation of the strain gauge is temporarily canceled, the fall of the characteristic curve of the maximum strain in FIG. 4 stops. When a greater force acts on the weigh hopper 28, the free end of the load cell 10 becomes displaced further upward. For this reason, again, the absolute value of the amount of deformation of the strain gauge turns to increase, and the characteristic curve of the maximum strain in FIG. 4 turns to rise.

As described above, even when an abnormal force acts on the weigh hopper 28 or the connecting member 14, downward displacement of the free end of the load cell 10 beyond a limit is limited because the first support portion 121a supports the first section 131a from below.

(4-2) Setup of Second Overload Protection Mechanism

When the force acting on the weigh hopper 28 further increases, the position where the free end of the load cell 10 and the connecting member 14 are connected becomes displaced upward, so the second section 132b also approaches the second support portion 122b. Here, a second force is defined as a force acting on the weigh hopper 28 so as to cause a bending moment acting to the connecting member 14 by which the second section 132b contacts the second support portion 122b. When a force greater than the second force acts on the weigh hopper 28, the second support portion 122b supports the second section 132b from above and inhibits the upward displacement of the second section 132b.

As shown in FIG. 4, the maximum strain in the gauge surface during this operation firstly decreases temporarily from when a force equal to or greater than the first force acts on the weigh hopper 28 and thereafter increases at a substantially constant rate in the opposite direction (positive direction). However, when the force beyond the second force acts, the maximum strain starts to increase at a rate different from what it had been until then. This is because the upward displacement of the second section 132b is inhibited as a result of the second section 132b contacting the second support portion 122b.

As a reference, the maximum strain in the gauge surface in a case where the second support portion 122b is not provided is indicated by the dashed line in FIG. 4. In the case where the second support portion 122b is not provided, when the force acting on the weigh hopper 28 further increases beyond the second force, the maximum strain in the gauge surface rapidly increases and reaches a limit value (the horizontal long dashed double-short dashed line in FIG. 4).

However, in the case where the second support portion 122b is provided, even when the force further increases beyond the second force, the rate of increase of the maximum strain in the gauge surface is gentler compared to the case where the second support portion 122b is not provided, and the load that can be applied before the maximum strain reaches the limit value (the horizontal long dashed double-short dashed line in FIG. 4) is more than double what it is in the case where the second support portion 122b is not provided.

Consequently, when the second force greater than the first force acts, a bending moment occurs in the connecting member 14 by using the first support portion 121a as a fulcrum and the connecting member 14 thereby tend to become deformed upward, but upward displacement of the free end of the load cell 10 beyond a limit is limited because the second support portion 122b supports the second section 132b from above.

(4-3) Behavior of Load Cell 10 and Connecting Member 14

FIG. 5A to FIG. 5D are front views of the load cell 10 and the connecting member 14 respectively showing the shapes of the load cell 10 and the connecting member 14 when no force, a 10 kg force, a 50 kg force, and a 160 kg force acts on the weigh hopper 28. It will be noted that FIG. 5A to FIG. 5D are views in which the actual amount of deformation is magnified 50 times.

Figure 5A:
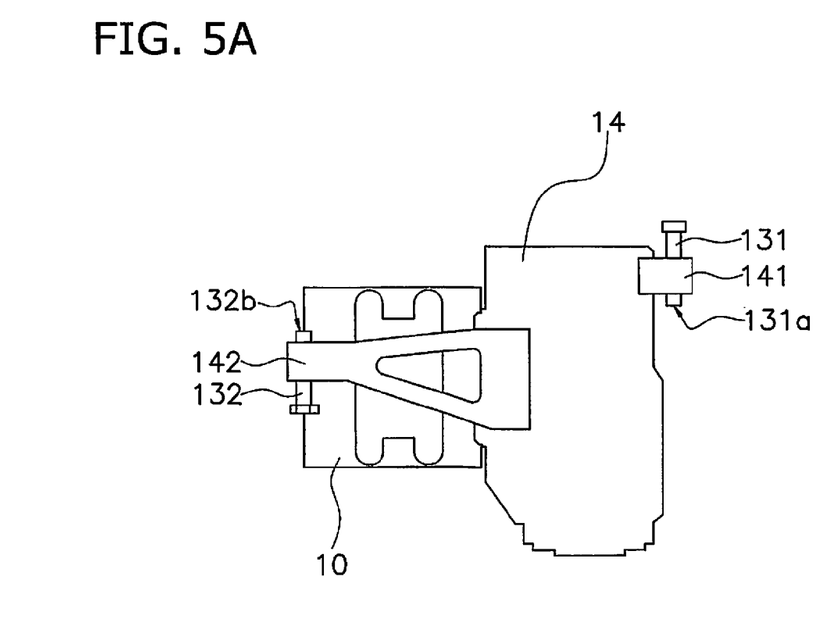
FIG. 5A is a front view of the load cell and the connecting member showing the shapes of the load cell and the connecting member when no force is acting on the weigh hopper.
Figure 5B:
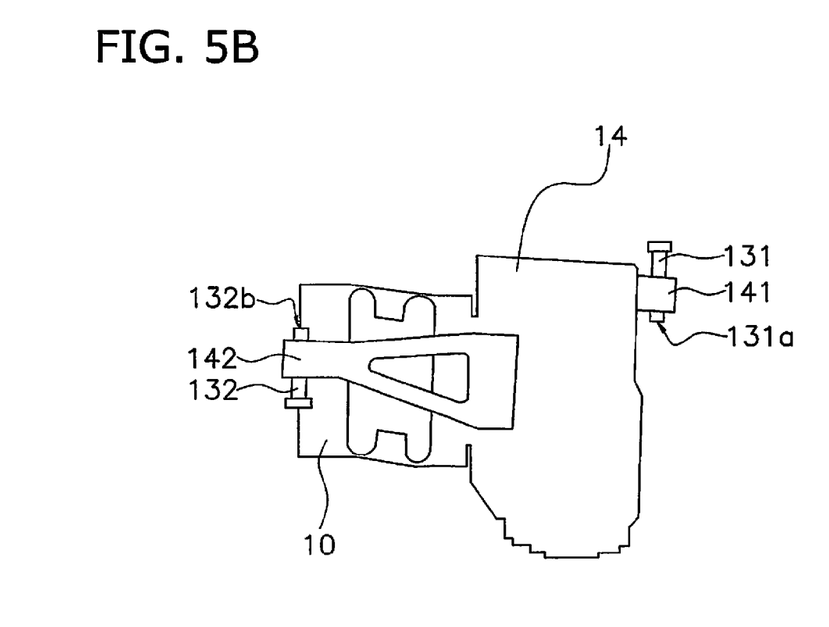
FIG. 5B is a front view of the load cell and the connecting member showing the shapes of the load cell and the connecting member when a 10 kg force is acting on the weigh hopper.
Figure 5C:
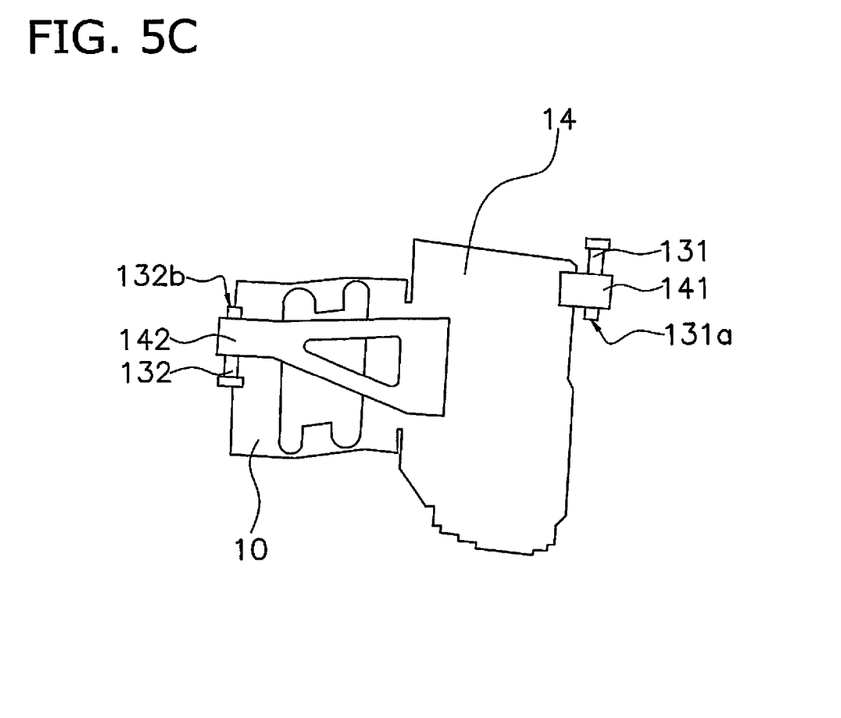
FIG. 5C is a front view of the load cell and the connecting member showing the shapes of the load cell and the connecting member when a 50 kg force is acting on the weigh hopper.
Figure 5D:
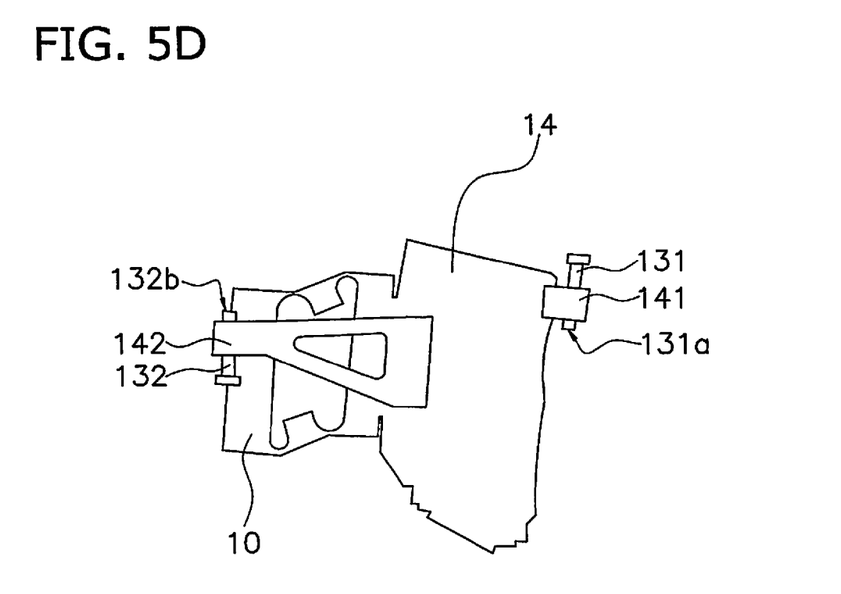
FIG. 5D is a front view of the load cell and the connecting member showing the shapes of the load cell and the connecting member when a 160 kg force is acting on the weigh hopper.
Figure 5E:
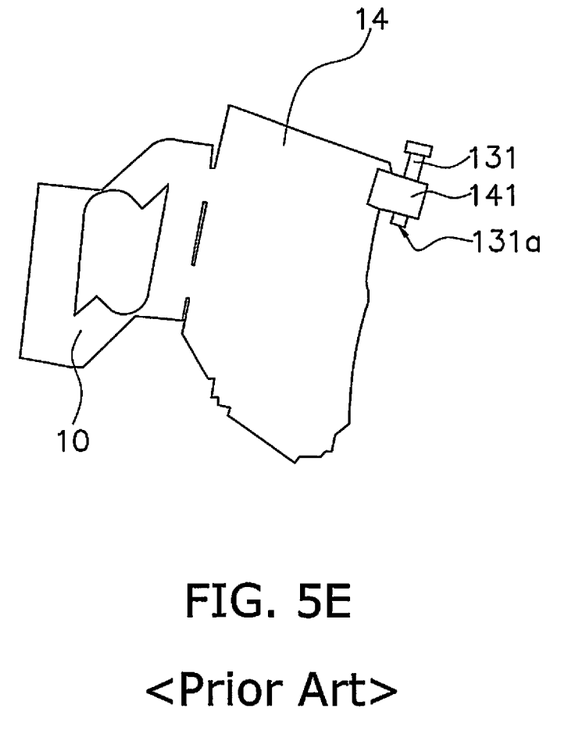
FIG. 5E is a front view of the load cell and the connecting member showing the shapes of the load cell and the connecting member when a 160 kg force is acting on the weigh hopper in a conventional type not equipped with a second overload protection mechanism.

Furthermore, FIG. 5E is a front view of the load cell 10 and the connecting member 14 showing the shapes of the load cell 10 and the connecting member 14 when a 160 kg force acts on the weigh hopper 28 in a conventional type not equipped with the second overload protection mechanism in which the second support portion 122b supports the second section 132b. It will be noted that FIG. 5E is a view in which the actual amount of deformation is magnified 50 times.

As shown in FIG. 5A, when no force is acting on the weigh hopper 28, no deformation is seen in the load cell 10 and the connecting member 14. As shown in FIG. 5B, when a 10 kg force acts on the weigh hopper 28, or in other words when a force corresponding to the first force shown in FIG. 4 is acting, the free end of the load cell 10 is displaced downward.

As shown in FIG. 5C, when a 50 kg force acts on the weigh hopper 28, or in other words when a force corresponding to the second force shown in FIG. 4 is acting, a bending moment acts to the connecting member 14 by using the first support portion 121a as a fulcrum and the free end of the load cell 10 is displaced upward because the first section 131a is supported by the first support portion 121a (see FIG. 2). Since the second section 132b is supported by the second support portion 122b (see FIG. 2) at this time, upward displacement of the free end of the load cell 10 is thereafter limited.

As shown in FIG. 5D, when a 160 kg force acts on the weigh hopper 28, upward displacement of the free end of the load cell is seen even though the second section 132b is supported by the second support portion 122b. This is because the connecting member 14 and the fixing member 12 themselves are deformed.

Even so, the amount of deformation is outstandingly smaller compared to the change in the shapes of the load cell 10 and the connecting member 14 in the conventional type not equipped with the second overload protection mechanism shown in FIG. 5E, and the effect of the second overload protection mechanism in which the second support portion 122b supports the second section 132b is remarkable.

(5) Characteristics 5-1

The weighing device 100 is equipped with the first overload protection mechanism and the second overload protection mechanism. The first overload protection mechanism includes the first support portion 121a disposed on the fixing member 12 and the first section 131a disposed on the connecting member 14. Furthermore, the second overload protection mechanism includes the second support portion 122b disposed on the fixing member 12 and the second section 132b disposed on the connecting member 14. When the first force acts on the weigh hopper 28, the first support portion 121a supports the first section 131a from below. Furthermore, when the second force greater than the first force acts on the weigh hopper 28, the second support portion 122b supports the second section 132b from above at the same time that the first support portion 121a supports the first section 131a.

As a result, when the first force acts on the weigh hopper 28, downward displacement of the free end of the load cell 10 beyond a limit is limited because the first support portion 121a supports the first section 131a from below. Furthermore, when the second force greater than the first force acts, a bending moment occurs in the connecting member 14 with the first support portion 121a as a fulcrum and the connecting member 14 is deformed upward, but upward displacement of the free end of the load cell 10 beyond a limit is limited because the second support portion 122b supports the second section 132b from above.

5-2

In the weighing device 100, the second support portion 122b is disposed in a position further away from the first support portion 121a than the free end of the load cell 10. When the second support portion 122b is disposed in a position further away from the first support portion 121a than the free end of the load cell 10, the second support portion 122b can be disposed avoiding interference with the surrounding structure without increasing the size of the structure.

(6) Modification Examples (6-1) First Modification Example

Figure 6:
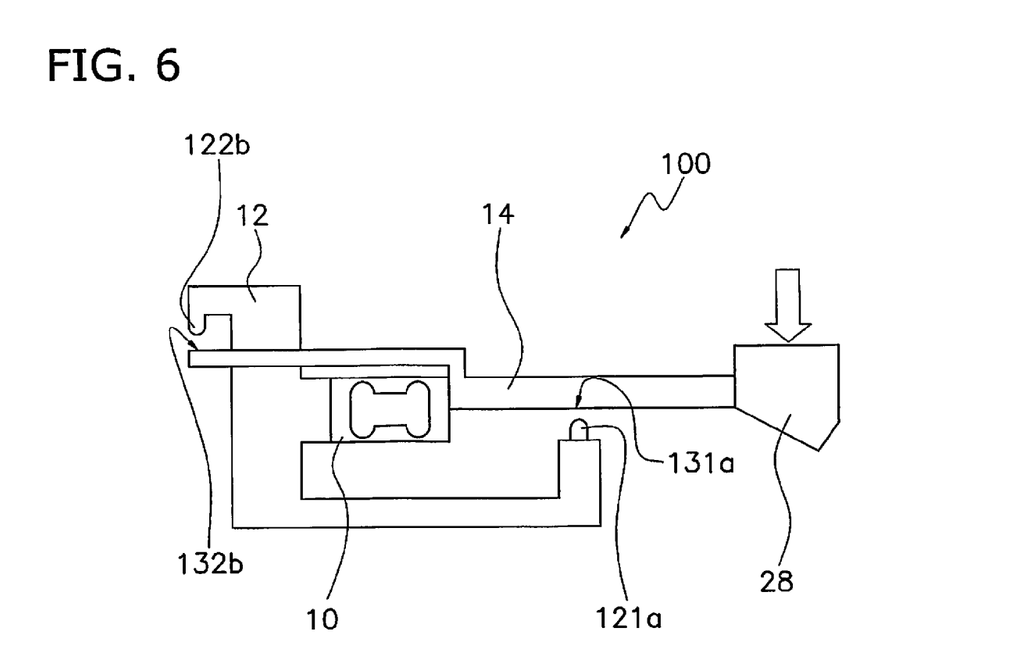
FIG. 6 is a schematic diagram of a simply modeled weighing device pertaining to a first modification example.

In the first embodiment, the second support portion 122b is disposed in a position further away from the first support portion 121a than the free end of the load cell 10, but the present invention is not limited to this. For example, as shown in FIG. 6 which is a configuration diagram of a simply modeled weighing device 100 pertaining to a first modification example, the second support portion 122b is disposed in a position further away from the first support portion 121a than the fixed end of the load cell 10.

The space between the second section 132b and the second support portion 122b becomes smaller as it is located closer to the first support portion 121a because of the lever principle, and it becomes more difficult to finely adjust that space. However, according to the weighing device 100 pertaining to this modification example, because the second support portion 122b is disposed in a position further away from the first support portion 121a than the fixed end of the load cell 10, the space between the second section 132b and the second support portion 122b becomes larger and it becomes easier to adjust that space.

(6-2) Second Modification Example

Figure 7:
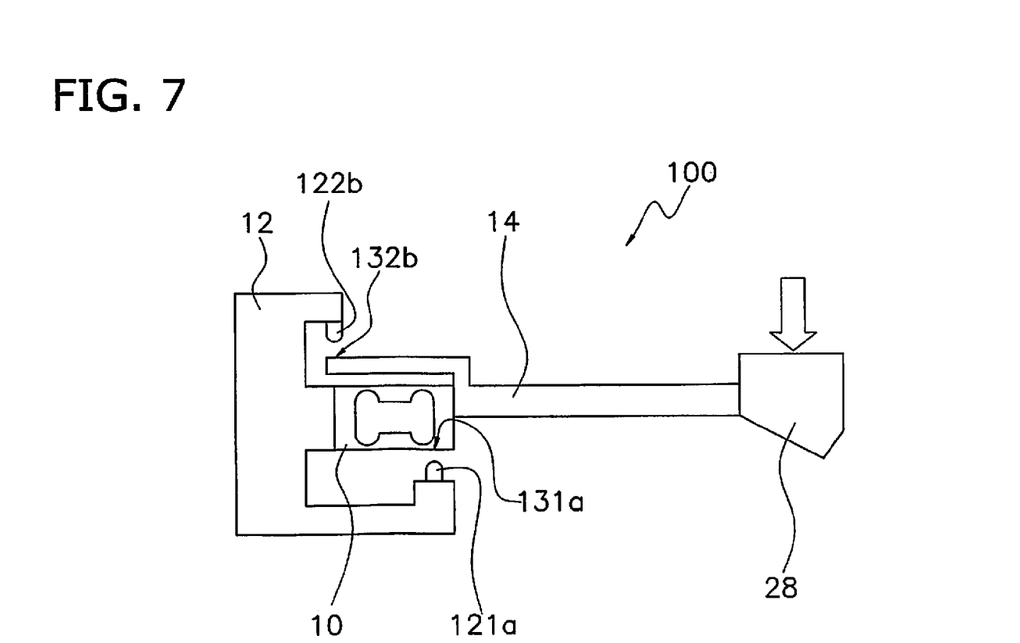
FIG. 7 is a schematic diagram of a simply modeled weighing device pertaining to a second modification example.

In the first embodiment, the first section 131a is set on the connecting member 14, but the present invention is not limited to this. For example, as shown in FIG. 7 which is a configuration diagram of a simply modeled weighing device 100 pertaining to a second modification example, the first section 131a is disposed on the lower surface of the load cell 10 near the free end, and the first support portion 121a is disposed in such a way as to face the first section 131a.

Since the first support portion 121a and the first section 131a are intended to limit downward displacement of the free end of the load cell 10 beyond a limit, the configuration of the second modification example is reasonable.

(6-3) Third Modification Example

However, when implementing a configuration like the one in the second modification example, in terms of the configuration of the fixing member 12, it is conceivable a case where it is difficult to dispose the first section 131a on the lower surface of the load cell 10 near the free end. Therefore, it is also possible to dispose an intervening member between the first support portion 121a and the first section 131a so that the first support portion 121a indirectly supports the first section 131a.

Figure 8:
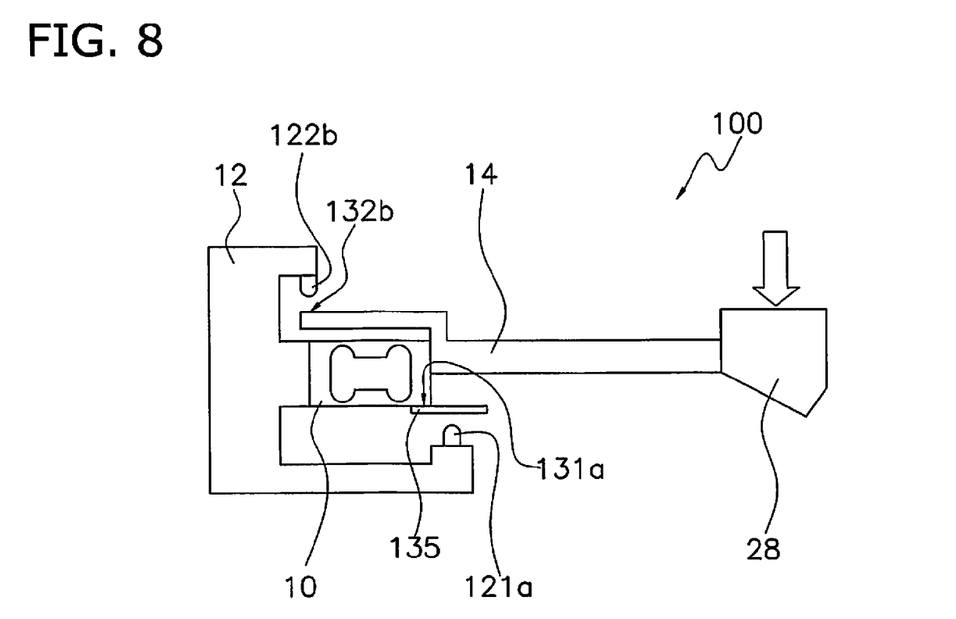
FIG. 8 is a schematic diagram of a simply modeled weighing device pertaining to a third modification example.

For example, as shown in FIG. 8 which is a configuration diagram of a simply modeled weighing device 100 pertaining to a third modification example, one end (fixed end) of a bracket 135 is fixed to the first section 131a disposed on the lower surface of the load cell 10 near the free end. The other end (free end) of the bracket 135 extends in a direction away from the free end of the load cell 10. Additionally, the first support portion 121a is disposed in such a way as to face a predetermined place between the fixed end and the free end of the bracket 135.

As a result, even if structurally the first support portion 121a and the first section 131a can not face one another, a configuration in which the first support portion 121a supports the first section 131a can be ensured by interposing the bracket 135.

(6-4) Fourth Modification Example

In the first embodiment, the present invention is described on the assumption that the force acting on the weigh hopper 28 is in a downward direction, but there are also instances where a force in an upward direction acts on the weigh hopper 28 because of improper handling by a worker.

In addition to the problem already described in the first embodiment, it is a problem of a fourth modification example to provide a weighing device that can limit upward displacement of the free end of the load cell 10 beyond a limit even when a force in an upward direction acts on the weigh hopper 28.

Figure 9:
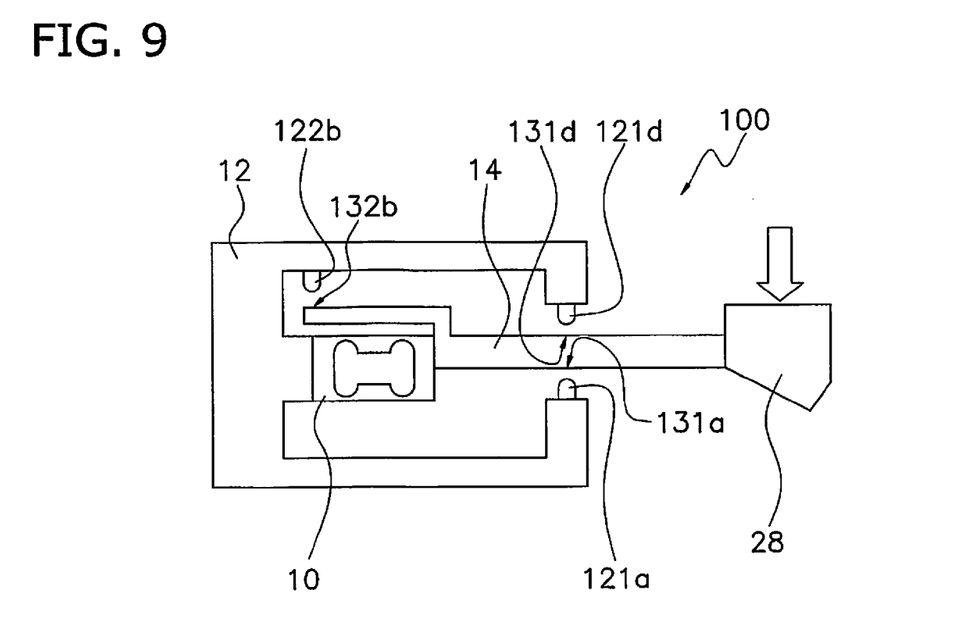
FIG. 9 is a schematic diagram of a simply modeled weighing device pertaining to a fourth modification example.

FIG. 9 is a configuration diagram of a simply modeled weighing device 100 pertaining to the fourth modification example. As shown in FIG. 9, a fourth support portion 121d is disposed above the connecting member 14 and opposes the first support portion 121a across the connecting member 14. Additionally, a fourth section 131d is set on the connecting member 14 in a position facing the fourth support portion 121d.

The specific configuration of the fourth support portion 121d and the fourth section 131d will be described using FIG. 2. As shown in FIG. 2, the fourth support portion 121d is set on the upper end surface of the opening 121, and the fourth section 131d is set on the upper end surface of the head portion of the first bolt 131.

The space between the fourth support portion 121d and the fourth section 131d is changed by adjusting how far the first bolt 131 is screwed in, but in this case, the space between the first support portion 121a and the first section 131a also changes at the same time. Therefore, the space between the fourth support portion 121*d* and the fourth section 131*d* is set while adjusting the space between the first support portion 121*a* and the first section 131*a*.

In the weighing device pertaining to this fourth modification example, even in a case where a worker improperly handles the weigh hopper 28 or the connecting member 14 by pushing it upward, upward displacement of the free end of the load cell 10 beyond a limit is limited because the fourth support portion 121*d* supports from above the fourth section 131*d* that is set on the connecting member 14.

Second Embodiment (1) Configuration of Weighing Device 200

Figure 10:
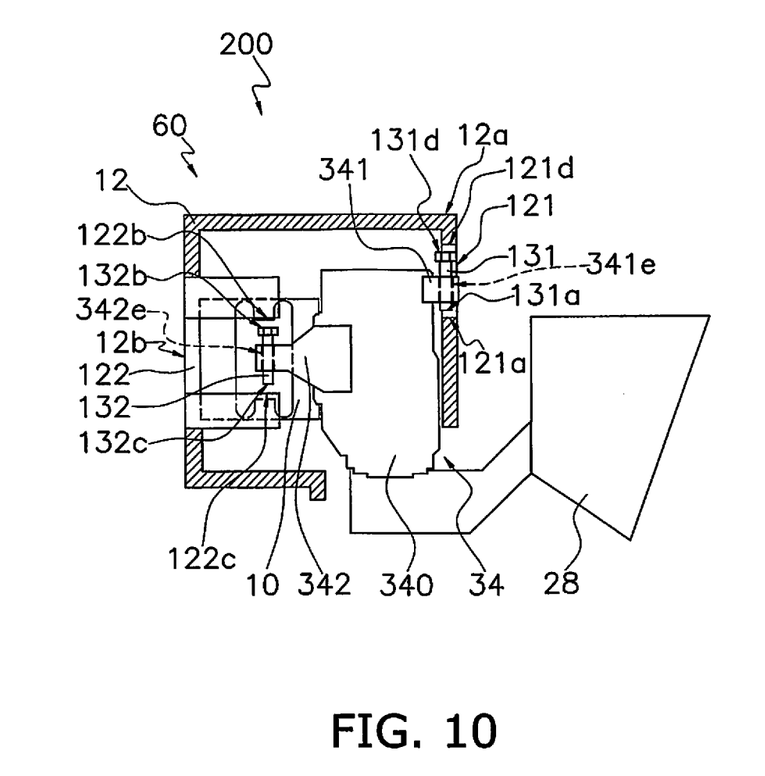
FIG. 10 is a perspective view of a weighing device pertaining to a second embodiment excluding the control unit.

FIG. 10 is a perspective view of a weighing device 200 pertaining to a second embodiment excluding the control unit 50. As shown in FIG. 10, the weighing unit 60 of the weighing device 200 has the load cell 10, the fixing member 12, and a connecting member 34. The configuration of the connecting member 34 of the weighing device 200 is changed from the connecting member 14 of the weighing device 100 pertaining to the first embodiment, therefore only the connecting member 34 will be described in detail here, and detailed description of other configurations will be omitted because they are the same as those in the first embodiment.

(2) Detailed Configuration (2-1) Connecting Member 34

The connecting member 34 has a main body block 340, a first block 341, and a second block 342. The main body block 340 connects the free end of the load cell 10 and the weigh hopper 28.

The first block 341 projects from the main body block 340 in such a way as to penetrate the opening 121. The first block 341 has a screw hole 341*e* passing through it from the upper end side toward the lower end side of the opening 121. The first bolt 131 is screwed into the screw hole 341*e*. A space between the upper surface of the head portion of the first bolt 131 and the upper end of the opening and the space between the distal end of the first bolt 131 and the lower end of the opening are both set to predetermined dimensions.

The second block 342 extends from the main body block 340 in such a way that its distal end portion enters the slit 122. The distal end portion of the second block 342 has a screw hole 342*e* passing through it from the upper end side toward the lower end side of the slit 122. The second block 342 is positionally adjusted in such a way that the screw hole 342*e* and the upper end of the slit 122 face one another, and the second bolt 132 is inserted in to the screw hole 342*e* from the upper side of the screw hole 342*e*.

It will be noted that the first section 131*a* is set on the distal end surface of the first bolt 131, and the first section 131*a* faces the first support portion 121*a*. Furthermore, the second section 132*b* is set on the upper surface of the head portion of the second bolt 132, and the second section 132*b* faces the second support portion 122*b*. Moreover, a third section 132*c* is set on the distal end surface of the second bolt 132, and the third section 132*c* faces a third support portion 122*c* which is the lower surface of the slit 122.

(2-2) Overload Protection Mechanisms

In the weighing device 200, setups that protect the load cell 10 from an overload are configured by the first support portion 121*a*, the second support portion 122*b*, and the third support portion 122*c*. The setup in which the first support portion 121*a* supports the first section 131*a* functions as a first overload protection mechanism, and the setup in which the second support portion 122*b* supports the second section 132*b* functions as a second overload protection mechanism.

Moreover, the setup in which the third support portion 122*c* supports the third section 132*c* functions as an auxiliary mechanism of the first overload protection mechanism and the second overload protection mechanism.

In the first overload protection mechanism, the first support portion 121*a* inhibits that the first section 131*a* is displaced equal to or more than a predetermined value. In the second overload protection mechanism, the second support portion 122*b* inhibits that the second section 132*b* is displaced equal to or more than a predetermined value. Furthermore, the auxiliary mechanism controls an increase in the amount of displacement of the load cell 10 until the first section 131*a* comes into contact with the first support portion 121*a*. It will be noted that the setup of each overload protection mechanism is explained in the description of operation below.

(3) Operation

Figure 11:
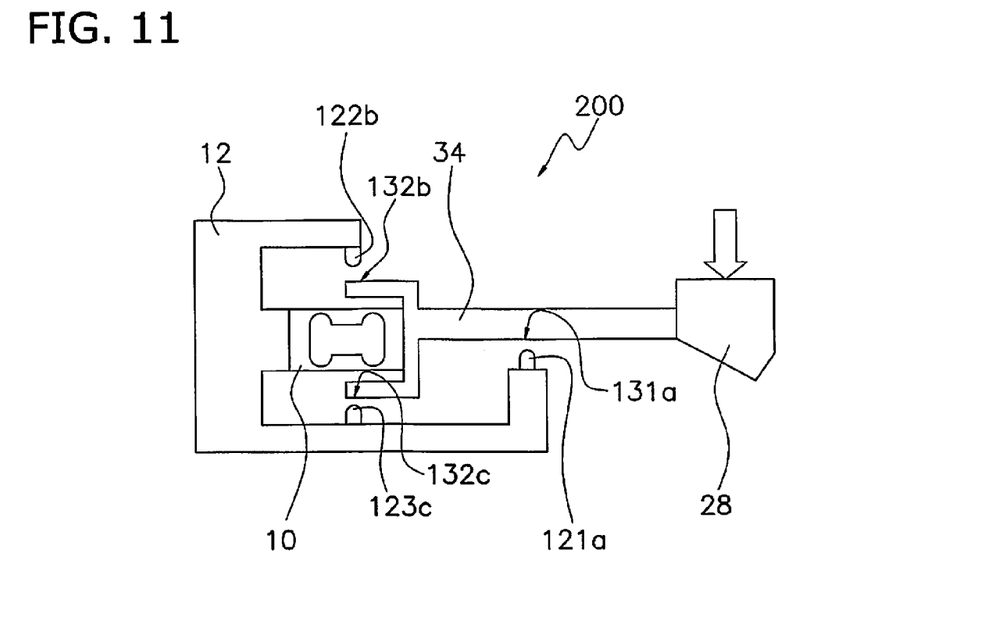
FIG. 11 is a schematic diagram of the simply modeled weighing device pertaining to the second embodiment.

FIG. 11 is a configuration diagram of the weighing device 200 pertaining to the second embodiment in which it is simply modeled in accordance with the lever principle. Furthermore, FIG. 12 is a graph showing the relationship between applied loads acting on the weigh hopper 28 and the output of the load cell 10.

(4-1) Setup of First Overload Protection Mechanism

First, as shown in FIG. 11, when a force in a downward direction acts on the weigh hopper 28, the connecting member 34 bends downward and the first section 131*a* approaches the first support portion 121*a*. However, the space between the third section 132*c* and the third support portion 122*c* is set in such a way that the third section 132*c* comes into contact with the third support portion 122*c* (in such a way that the auxiliary mechanism acts) before the first section 131*a* comes into contact with the first support portion 121*a* (before the first overload protection mechanism acts).

Figure 12:
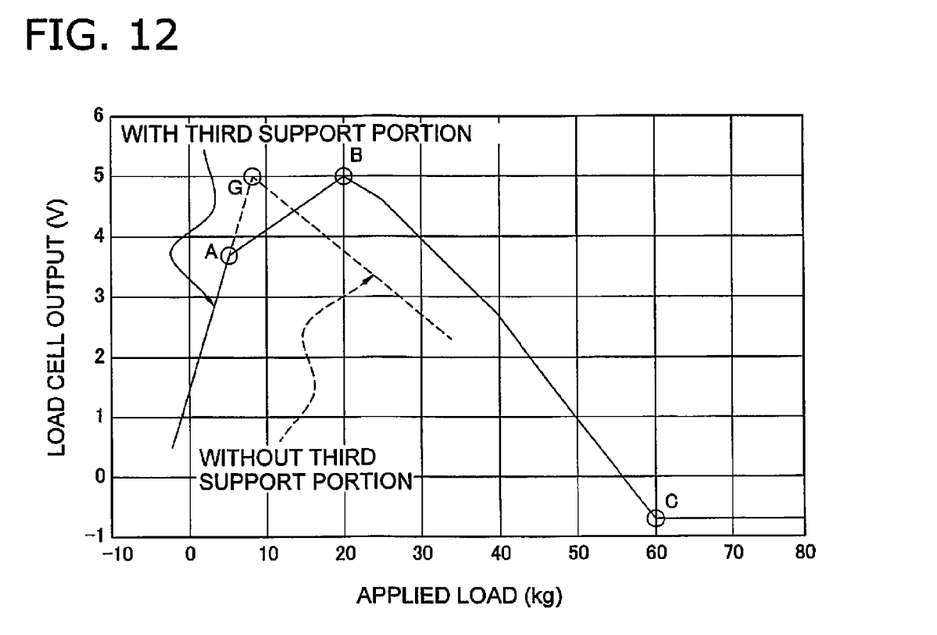
FIG. 12 is a graph showing the relationship between applied loads acting on the weigh hopper and the output of the load cell.

Therefore, as shown in FIG. 12, the output from the load cell 10 rapidly increases until a point A at which the third section 132*c* comes into contact with the third support portion 122*c*, but the output from the load cell 10 increases comparatively gently from the point A until a point B at which the first section 131*a* comes into contact with the first support portion 121*a*.

Then, after the first section 131*a* and the first support portion 121*a* contact one another, a bending moment occurs in the connecting member 34 with the first support portion 121*a* as a fulcrum and a force to lift the free end of the load cell 10 upward works.

Therefore, as shown in FIG. 12, the output from the load cell 10 falls after passing the point B (because the force works in the opposite direction of what it had been until then). Consequently, even when an abnormal force acts on the weigh hopper 28 or the connecting member 34, downward displacement of the free end of the load cell 10 beyond a limit is limited because the first support portion 121*a* supports the first section 131*a* from below.

(4-2) Setup of Second Overload Protection Mechanism

When the force acting on the weigh hopper 28 further increases, the position where the free end of the load cell 10 and the connecting member 34 are connected becomes displaced upward, so the second section 132b also approaches the second support portion 122b. Here, when a force to cause a bending moment acting to the connecting member 34 by which the second section 132b contacts the second support portion 122b is applied, the second support portion 122b supports the second section 132b from above and inhibits the upward displacement of the second section 132b. In other words, the second overload protection mechanism acts.

Therefore, as shown in FIG. 12, the output from the load cell 10 becomes substantially constant after passing a point C at which the second section 132b comes into contact with the second support portion 122b (the second overload protection mechanism acts).

As a reference, the output of the load cell 10 in a case where the third section 132c and the third support portion 122c are not provided is indicated by the dashed line in FIG. 12. As shown in FIG. 12, in a case where the third section 132c and the third support portion 122c are not provided, the output of the load cell 10 rises on an extension line of point A to a point G at which the output level is the same as point B, and falls after passing the point G (because a force works in the opposite direction of what it had been until then).

In a case where the third section 132c and the third support portion 122c are provided, the output of the load cell 10 increases gently compared to a case where the third section 132c and the third support portion 122c are not provided from when the third section 132c comes into contact with the third support portion 122c until when the first section 131a comes into contact with the first support portion 121a. For that reason, the applied load by which the first section 131a comes into contact with the first support portion 121a can be made larger than when the third section 132c and the third support portion 122c are not provided. That is, it becomes possible to set large the space between the first section 131a and the first support portion 121a.

The mechanism by which this happens is a principle wherein when a certain load (a load exceeding the weighing range of the weighing device) acts on the load cell 10, first, the third support portion 122c comes into contact with the third section 132c and the connecting member 34 rotates by using the third section 132c as a fulcrum, next, the first section 131a comes into contact with the first support portion 121a, the connecting member 34 rotates by using the first section 131a as a fulcrum and the third support portion 122c moves away from the third section 132c, and finally, the second section 132b comes into contact with the second support portion 122b.

(5) Characteristics

For example, in adjusting the space between the first section 131a and the first support portion 121a, adjustment with high precision and at an extremely small distance is required. The reason is because it is necessary to adjust the space in such a way that the first section 131a does not come into contact with the first support portion 121a under a load within the weighing range and in such a way that the first section 131a comes into contact with the first support portion 121a before the amount of displacement of the load cell 10 exceeds a limit.

However, because there are cases where structurally (a waterproof structure, etc.) there is no access for adjusting the space between the first section 131a and the first support portion 121a or there is a difficulty in access for adjusting the space between the first section 131a and the first support portion 121a, high-precision adjustment of the space between the first section 131a and the first support portion 121a is not easy.

In contrast, by disposing the third section 132c and the third support portion 122c in positions where it is easy to adjust the space between them, adjustment of the space between the first section 131a and the first support portion 121a can be simplified or can be made unnecessary.

Figure 13:
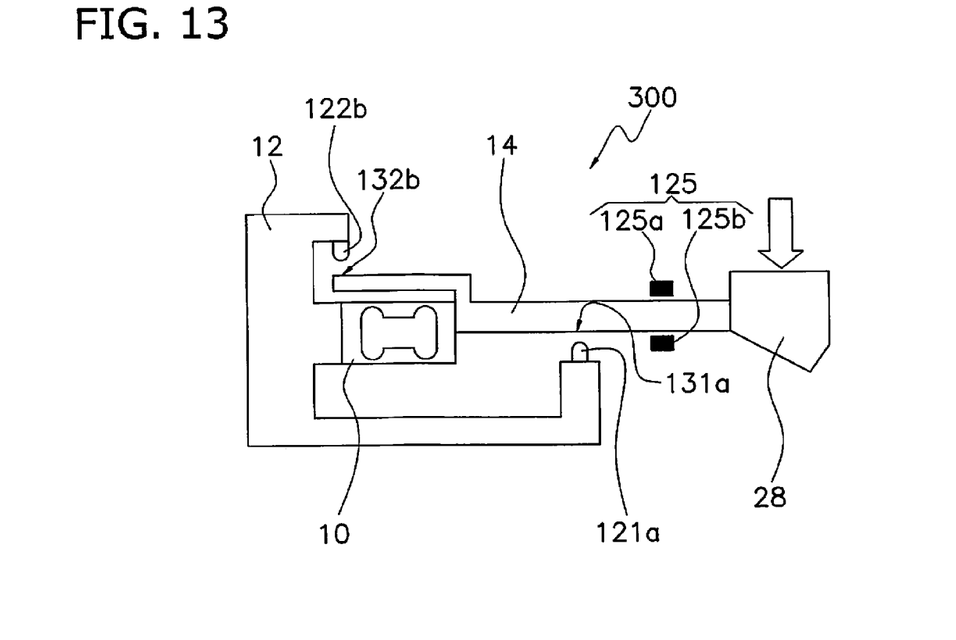
FIG. 13 is a simply modeled schematic diagram of a weighing device equipped with an overload protection mechanism that functions when operation is shut down.

Other Embodiments (1) Overload Protection Mechanism that Functions when Operation is Shut Down FIG. 13 is a simply modeled configuration diagram of a weighing device 300 equipped with an overload protection mechanism that functions when operation is shut down. As shown in FIG. 13, the weighing device 300 is the same type of weighing device as the weighing device 100 pertaining to the first embodiment but differs from the weighing device 100 pertaining to the first embodiment in that it is equipped with a lock mechanism 125 that sandwiches the connecting member 14.

The lock mechanism 125 includes an upper lock member 125a positioned above the connecting member 14, a lower lock member 125b positioned below the connecting member 14, and a drive unit (not shown in the drawing) that retracts the upper lock member 125a and the lower lock member 125b when the weighing device 300 is in operation. The drive unit is appropriately selected from a motor, a solenoid, and an air cylinder, for example.

The upper lock member 125a and the lower lock member 125b are always biased in the direction toward the connecting member 14 by springs (not shown in the drawing) in such a way that they can move to positions in which they sandwich the connecting member 14. When operation is shut down and the drive unit stops retracting the upper lock member 125a and the lower lock member 125b, the upper lock member 125a and the lower lock member 125b break into lock positions in which they lock the connecting member 14 because of the springs.

When operation is shut down, for example, even if a worker improperly applies excessive force to the weigh hopper 28 or the connecting member 14 during maintenance, a situation where the load cell 10 is damaged can be avoided because the upper lock member 125a and the lower lock member 125b restrain the connecting member 14 from moving.

Figure 14:
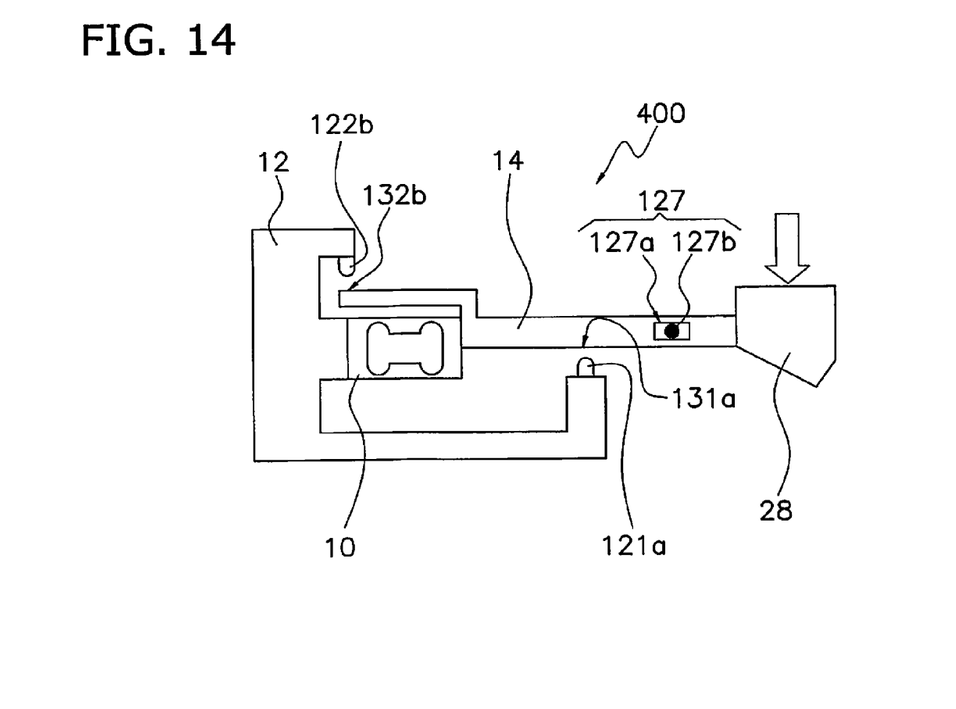
FIG. 14 is a simply modeled schematic diagram of a weighing device equipped with another overload protection mechanism that functions when operation is shut down.

(2) Another Overload Protection Mechanism that Functions when Operation is Shut Down FIG. 14 is a simply modeled configuration diagram of a weighing device 400 equipped with another overload protection mechanism that functions when operation is shut down. As shown in FIG. 14, the weighing device 400 is the same type of weighing device as the weighing device 100 pertaining to the first embodiment but differs from the weighing device 100 pertaining to the first embodiment in that it is equipped with a lock mechanism 127 that restrains the connecting member 14.

The lock mechanism 127 includes a through hole 127a penetrating the connecting member 14, a lock member 127b being inserted into the through hole 127a, and a drive unit (not shown in the drawing) that retracts the lock member 127*b* from the through hole 127*a* when the weighing device 400 is in operation. The drive unit is appropriately selected from a motor, a solenoid, and an air cylinder, for example.

The lock member 127*b* is always biased in the direction of the connecting member 14 by a spring (not shown in the drawing) in such a way that it can move to a position in which it enters the through hole 127*a* in the connecting member 14. When operation is shut down and the drive unit stops retracting the lock member 127*b*, the lock member 127*b* enters into the through hole 127*a* of the connecting member 14 because of the spring and restrains the connecting member 14.

When operation is shut down, for example, even if a worker improperly applies excessive load to the weigh hopper 28 or the connecting member 14 during maintenance, a situation where the load cell 10 is damaged can be avoided because the lock member 127*b* restrains the connecting member 14 from moving.

INDUSTRIAL APPLICABILITY

As described above, as the present invention can protect a load cell of a weighing device from an overload, the present invention is useful for protection of not only weighing devices but also any devices utilizing a load cell.

REFERENCE SIGNS LIST

10 Load Cell
12 Fixing Member
14 Connecting member
28 Weigh hopper
100 Weighing Device
121*a* First Support Portion (Overload Protection Mechanism)
122*b* Second Support Portion (Overload Protection Mechanism)
122*c* Third Support Portion (Overload Protection Mechanism)
121*d* Fourth Support Portion (Upper Opposing Support Portion, Overload Protection Mechanism)
131*a* First Section (Overload Protection Mechanism)
132*b* Second Section (Overload Protection Mechanism)
132*c* Third Section (Overload Protection Mechanism)
131*d* Fourth Section (Overload Protection Mechanism)
135 Bracket (Prescribed Member)

CITATION LIST

Patent Literature

Patent Document 1: Japanese Utility Model Application Publication No. H05-28937

What is claimed is:

1. A weighing device using a load cell, the weighing device comprising:
   a fixing member having a load cell support portion a load cell having a first end and a second end spaced apart from the first end, the first end being fixedly attached to the load cell support portion of the fixing member;
   a connecting member having a first portion and a second portion, the first portion being fixedly attached to the second end of the load cell;
   a weigh hopper fixedly attached to the second portion of the connecting member and being configured to receive an object or objects to be weighed; and
   an overload protection mechanism having a first support portion and a second support portion that are disposed on the fixing member protecting the load cell from an overload configured such that
   when a first load acts on the load cell, the first support portion supports from below at least one of the load cell and the connecting member, and
   when a second load greater than the first load acts on the load cell, at the same time that the first support portion supports from below at least one of the load cell and the connecting member, the second support portion additionally supports from above at least one of the connecting member and the load cell in the opposite side to the weigh hopper across the first support portion.

2. The weighing device according to claim 1, wherein the second support portion is disposed in a position further away from the first support portion than the second end of the load cell.

3. The weighing device according to claim 1, wherein the second support portion is disposed in a position further away from the first support portion than the first end of the load cell.

4. The weighing device according to claim 1, wherein the first support portion is located under the connecting member, and
   the overload protection mechanism further includes an upper support portion that is positioned above the connecting member opposite the first support portion across the connecting member.

5. The weighing device according to claim 1, wherein the load cell is located between the first support portion and the second support portion such that the first support portion is located proximate the second side of the load cell and the second support portion is located proximate the first side of the load cell.

6. The weighing device according to claim 1, wherein the first load acting on the load cell is greater than a first force level below which the load cell support portion completely supports the load cell.

* * * * *